(12) United States Patent
Lee

(10) Patent No.: US 6,764,570 B2
(45) Date of Patent: Jul. 20, 2004

(54) METHOD AND APPARATUS FOR BONDING A COATING TO A WEB OF CLOTH OR FOAM

(76) Inventor: Chun-Hsien Lee, No. 536-1, Ta Chin Street, Taichung (TW)

(*) Notice: Subject to any disclaimer, the term of this patent is extended or adjusted under 35 U.S.C. 154(b) by 255 days.

(21) Appl. No.: 09/940,410

(22) Filed: Aug. 27, 2001

(65) Prior Publication Data

US 2003/0037876 A1 Feb. 27, 2003

(51) Int. Cl.[7] .................. B32B 31/00; B32B 31/08; B29D 9/00
(52) U.S. Cl. .................. 156/285; 156/87; 156/286; 156/324; 156/381
(58) Field of Search .................. 156/87, 285, 286, 156/324, 381

(56) References Cited

U.S. PATENT DOCUMENTS 3,030,245 A * 4/1962 Greiner et al. ............. 156/62.8
3,616,197 A   10/1971 Amberg et al. ............ 428/201
3,655,486 A    4/1972 Hagino et al. ............. 156/360
3,906,134 A    9/1975 Pohl ........................ 428/206

FOREIGN PATENT DOCUMENTS

DE          3507667       8/1987
JP          10236093      9/1998

* cited by examiner

Primary Examiner—Jeff H. Aftergut
Assistant Examiner—Justin Fischer
(74) Attorney, Agent, or Firm—Alan D. Kamrath; Nikolai & Mersereau, P.A.

(57) ABSTRACT

A method and an apparatus are provided for bonding a coating to a web of cloth or foam without sacrificing the characteristics of the spandex mesh or foam. The coating and the cloth or foam are bonded and heated and then conveyed to an aspiration device for removing air between the coating and the cloth, thereby providing a thorough bonding therebetween.

13 Claims, 7 Drawing Sheets

METHOD AND APPARATUS FOR BONDING A COATING TO A WEB OF CLOTH OR FOAM

BACKGROUND OF THE INVENTION

1. Field of the Invention

The present invention relates to a method and apparatus for bonding a coating to a web of cloth or foam.

2. Description of the Related Art

A conventional method for bonding coatings to a web of cloth made of multiyarns comprises a step of passing the web of cloth through a composite T-shaped mold that extrudes two layers of coatings. One layer of coatings is a highly adhesive composite thermoplastic coating, and the other layer of coating is a surface plastic coating that acts as a skin of the bonded cloth. The coatings are bonded by roiling to the web of cloth when in a molten state to thereby form a web of waterproof cloth. However, when applying such a method to a web of spandex mesh or foam, the spandex mesh or foam is in rigid contact with rigid metal rollers during the rolling procedure. The rolling force is beyond the yield point of the spandex mesh or foam and thus destroys the required elasticity. In addition, the coatings are stuck into the spandex mesh instead of being bonded to the surface of the spandex mesh such that the resultant patterns on the surface of the spandex mesh become irregular and deformed. The price of the product is thus adversely affected. It is, therefore, a long and unfulfilled need to bond a coating to a web of spandex mesh or foam without sacrificing the characteristics of the spandex mesh or foam.

SUMMARY OF THE INVENTION

An object of the present invention is to provide a method and an apparatus for bonding a coating to a web of cloth or foam without sacrificing the characteristics of the spandex mesh or foam. The coating and the cloth or foam are bonded and heated and then conveyed to an aspiration means for removing air between the coating and the cloth, thereby providing a thorough bonding therebetween. When the method is applied to a web of spandex mesh or foam, the elasticity of the spandex mesh or foam is not adversely affected while the patterns on the spandex mesh are still clear.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
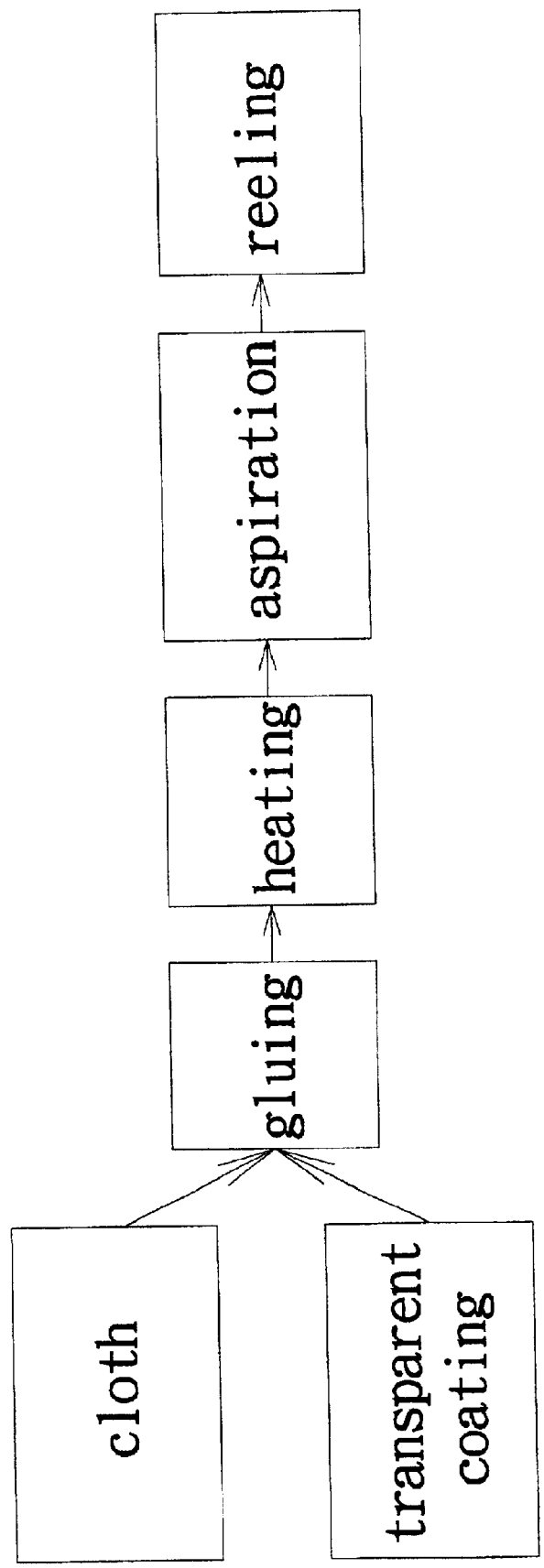
FIG. 1 is a schematic block diagram illustrating a method for bonding a web of cloth or foam in accordance with the present invention.

Referring to FIG. 1, a method for bonding a coating on a material web (such as a web of cloth or foam) in accordance with the present invention comprises the steps of: (a) bonding the coating and the web of cloth together such as by glue, (b) heating the web of cloth having the coating bonded thereto; and (c) removing air between the coating and the web of cloth by aspiration to thereby provide complete bonding between the coating and the web of cloth. The resultant web of cloth/coating is wound around on a reel.

Figure 2:
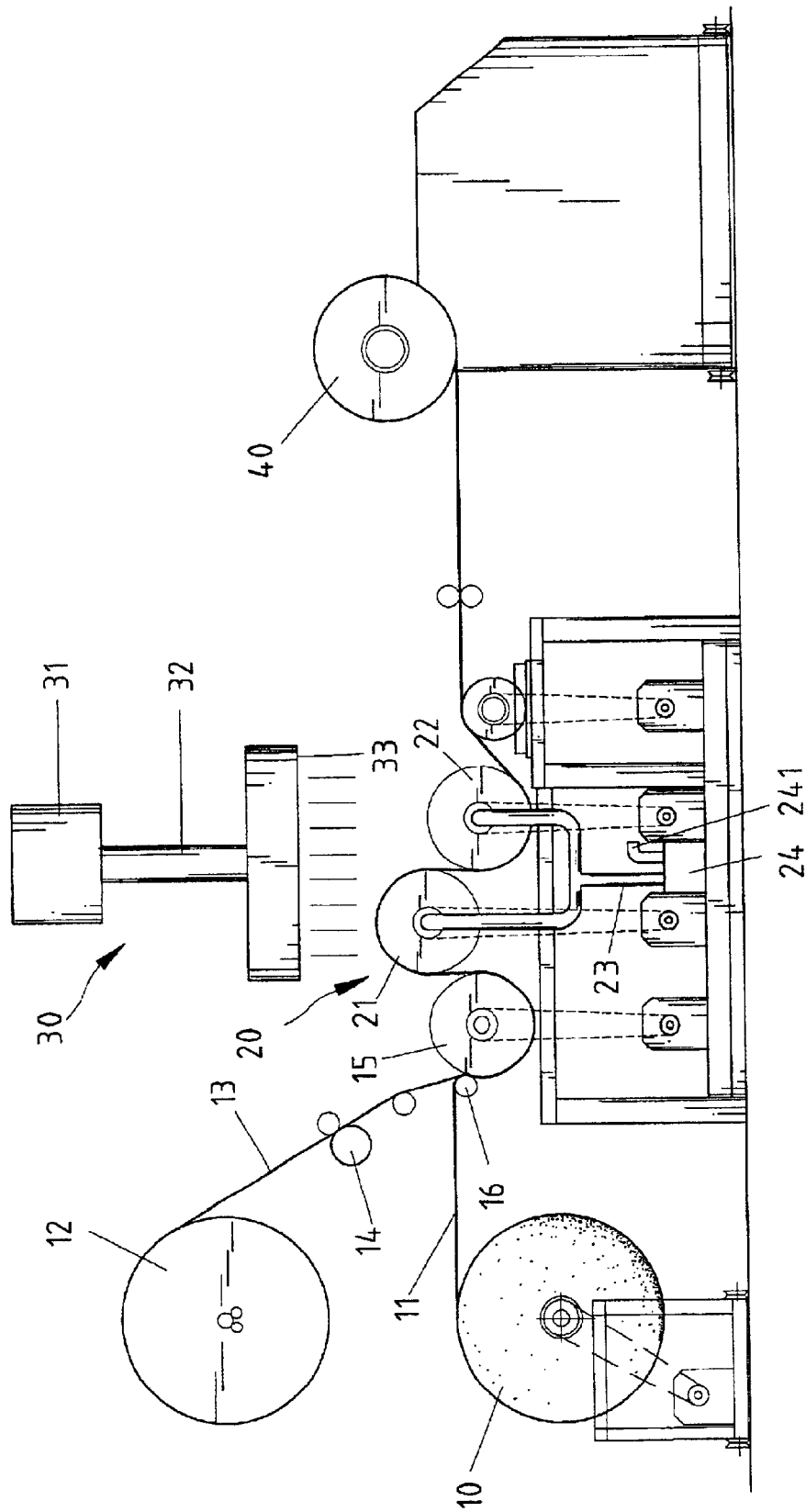
FIG. 2 is a schematic side view illustrating an apparatus for implementing the method for bonding a web of cloth or foam in accordance with the present invention.

FIG. 2 illustrates an apparatus for implementing the method in accordance with the present invention. A first feeding roller 10 feeds a web of cloth 11 and a second feeding roller 12 feeds a transparent coating 13. A glue-applying roller 14 applies glue to a face of the coating 13 when the coating 13 passes therethrough.

The web of cloth 11 and the coating 13 are guided to a guide roller 16 at which the web of cloth 11 and the coating 13 are bonded by the glue applied to the coating 13. The bonded web of cloth/coating 11 and 13 is fed to and thus heated by a heating roller 15 located downstream of the guide roller 16.

Figure 3:
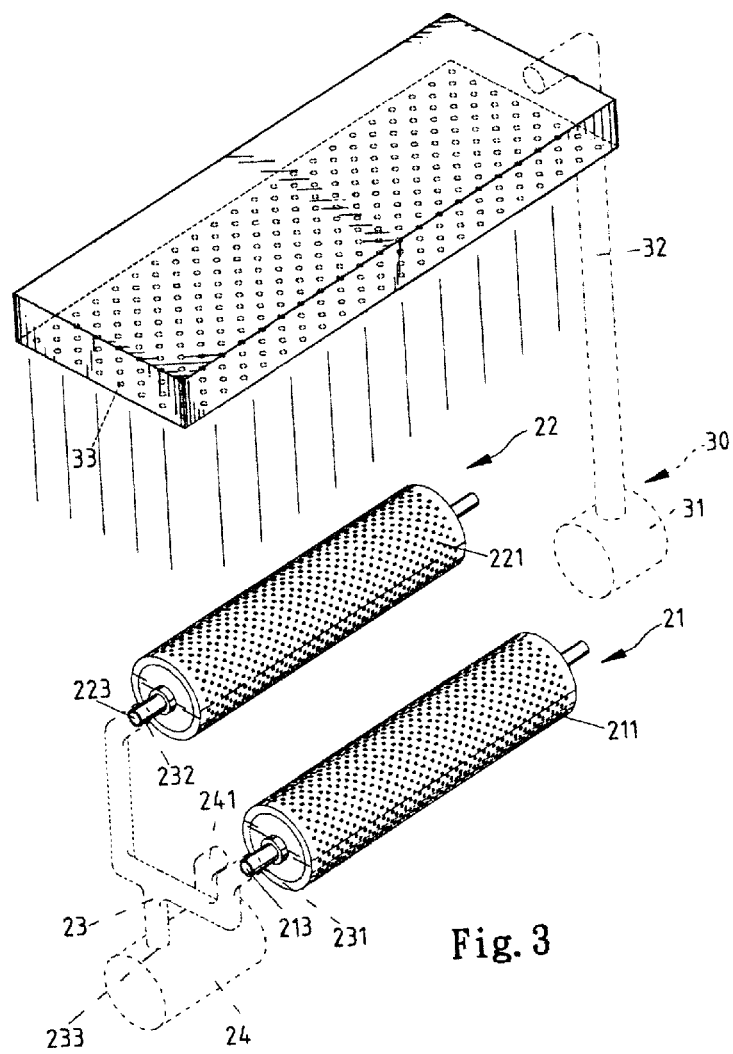
FIG. 3 is an exploded perspective view of an air supply system and an aspiration device of the apparatus in FIG. 2.
Figure 4:
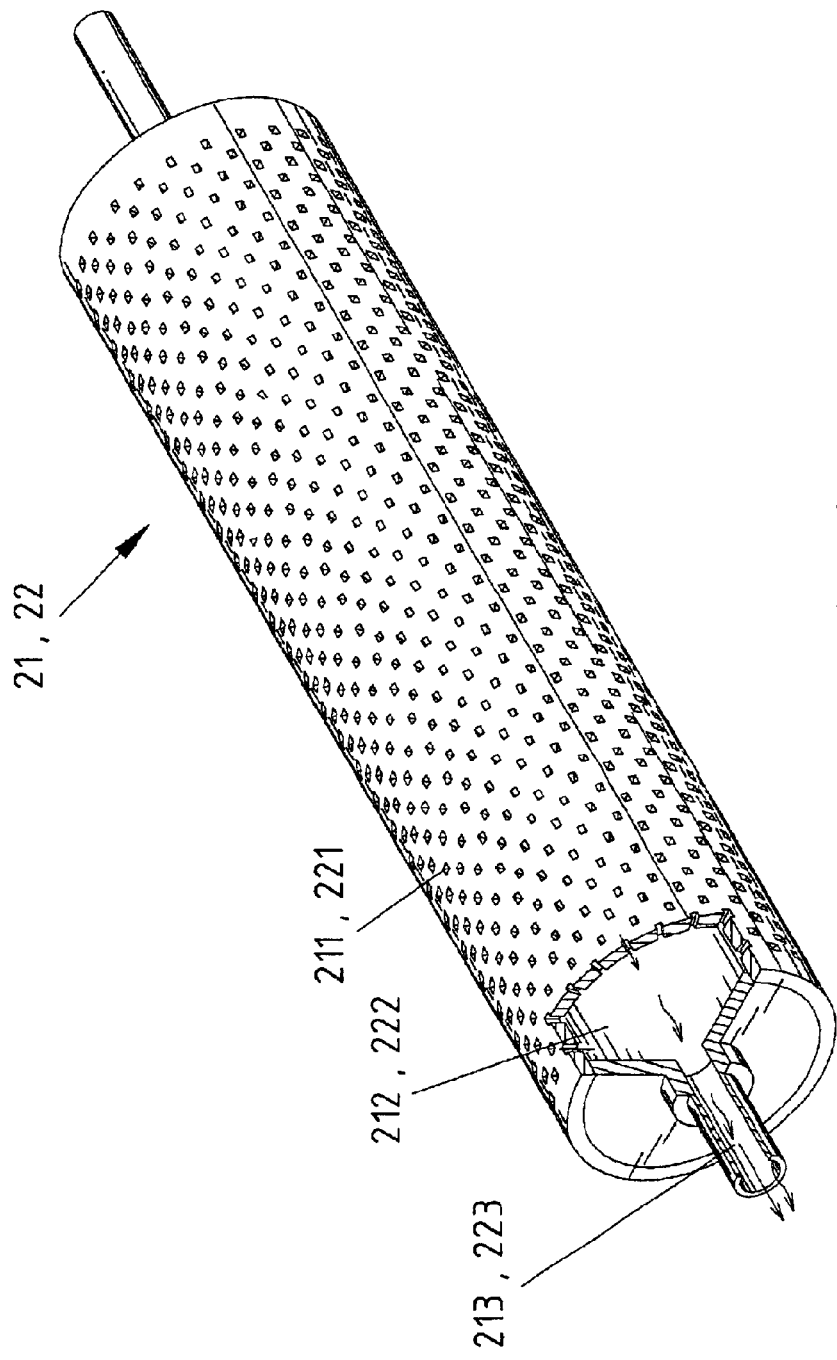
FIG. 4 is a perspective view, partly cutaway, of an aspiration cylinder of the apparatus in FIG. 2.

The heated web of cloth/coating 11 and 13 is passed through an aspiration/bonding device 20 that comprises two aspiration cylinders 21 and 22. As illustrated in FIGS. 3 and 4, each aspiration cylinder 21, 22 comprises a plurality of vents 211 and 221 in an outer periphery thereof that are communicated with a longitudinal chamber 212, 222 thereof. An outlet manifold 23 is provided and comprises two inlets 231 and 232 that are connected to outlet ends 213 and 223 of the longitudinal chambers 212 and 222. The outlet manifold 23 further comprises an outlet 233 that is communicated to an inlet (not labeled) of an aspiration means 24 such as a vacuum pump having an outlet 241.

The apparatus further comprises an air supply source or system 30 comprising a compressor 31 with an outlet pipe 32 and a plurality of vents 33 communicated with the outlet pipe 32. The vents 33 are located right above the aspiration cylinders 21 and 22. When the heated web of cloth/coating 11 and 13 pass through the aspiration cylinders 21 and 22, the downward air stream from the vents 33 make the coating 13 and the web of cloth 11 be further close to each other. In addition, the air from the vents 33 is aspirated by the aspiration means 24 into the longitudinal chambers 212 and 222 of the aspiration cylinders 21 and 22 via the vents 211 and 221. The air is then discharged via the outlet 241 of the aspiration means 24. The internal pressures in longitudinal chambers 212 and 222 of the aspiration cylinders 21 and 22 are nearly vacuum, so that thorough contact is made between the coating 13 and the web of cloth 11.

A reel 40 is provided downstream the aspiration/bonding device 20 for reeling the web of cloth/coating 11 and 13. It is noted that the elasticity of the web of cloth/coating 11 and 13 is not adversely affected, as no rolling is provided for bonding. In addition, when the method is applied to a web of spandex mesh, the patterns on the spandex mesh can be viewed through the transparent coating 13 after processing. The spandex mesh can be replaced by foam.

Figure 5:
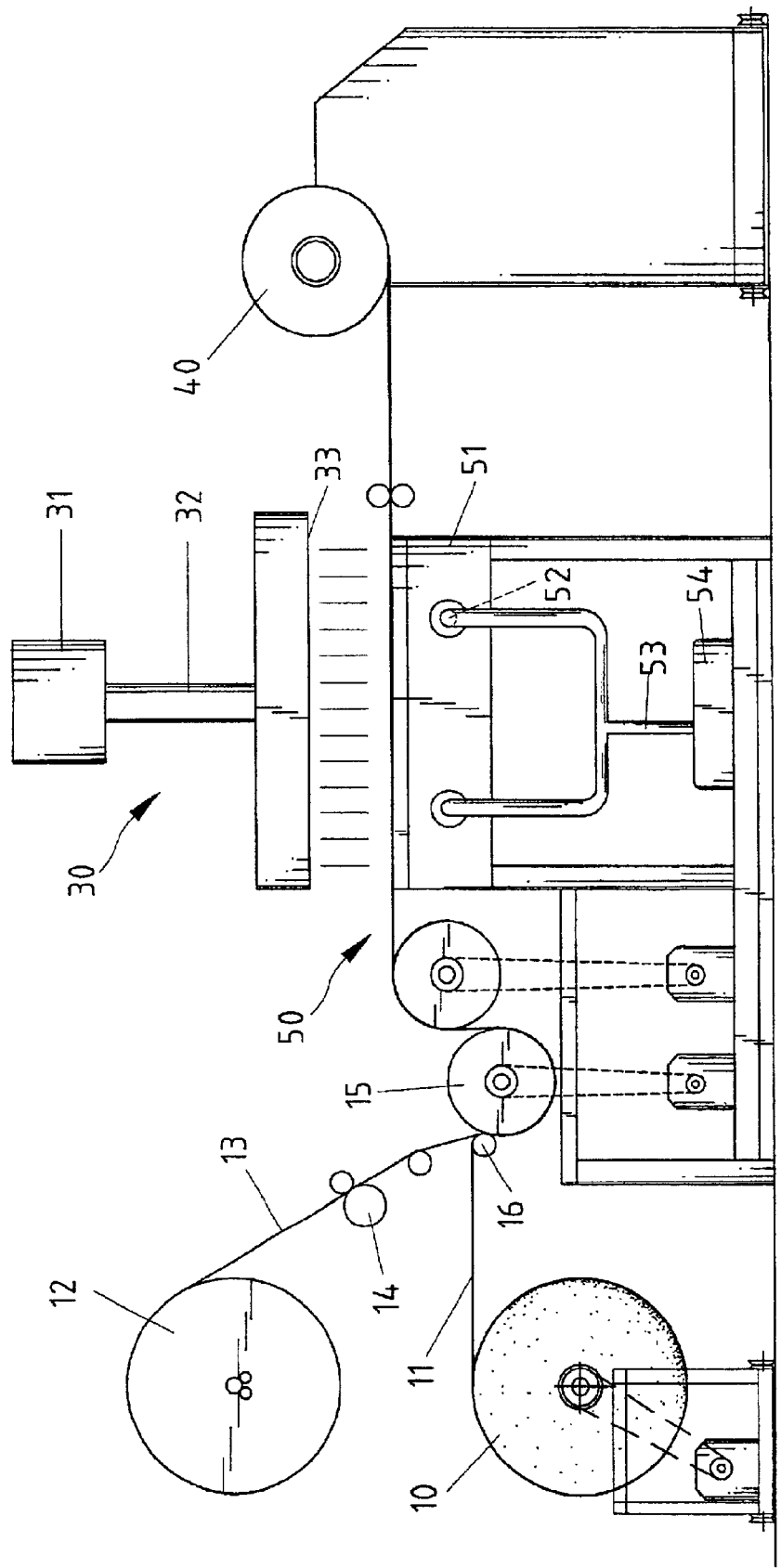
FIG. 5 is a schematic side view illustrating a modified embodiment of the apparatus for implementing the method for bonding a web of cloth or foam in accordance with the present invention.
Figure 6:
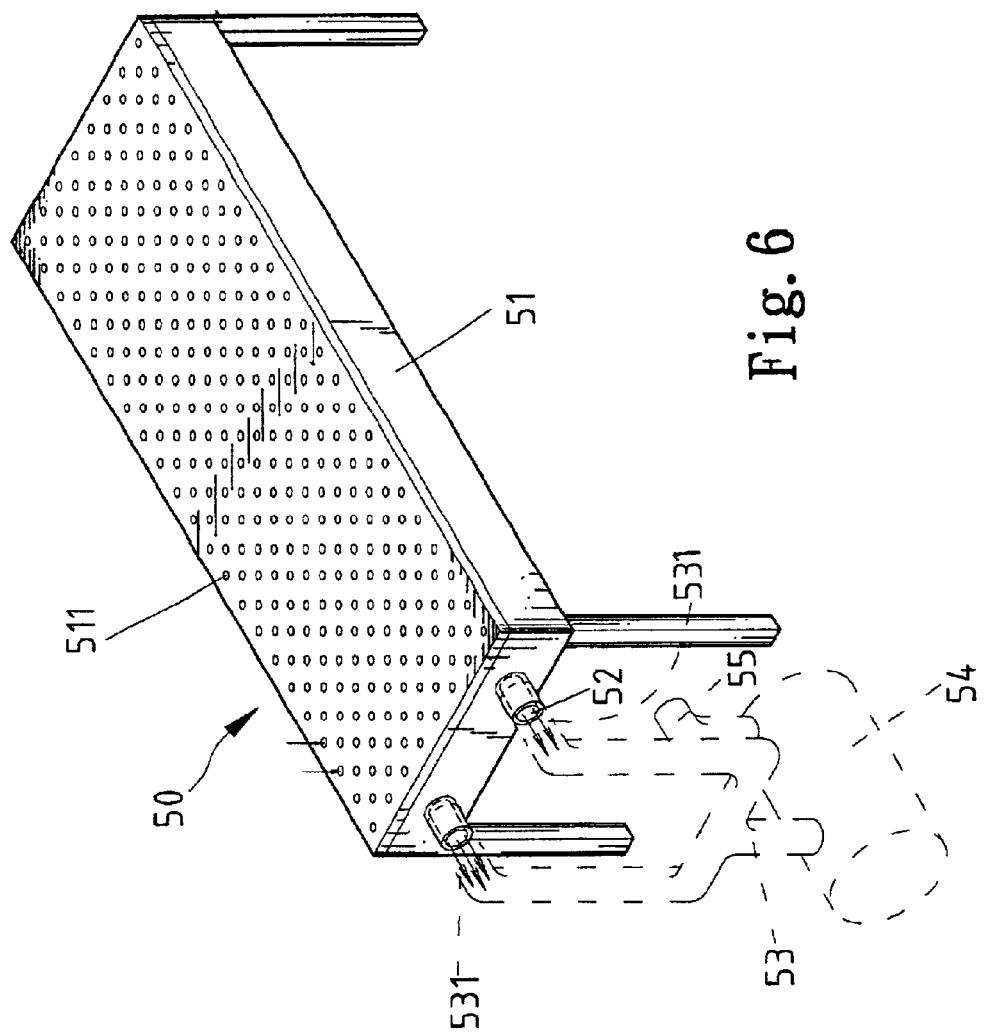
FIG. 6 is a perspective view of an aspiration device of the apparatus in FIG. 5.

FIGS. 5 and 6 illustrate a modified embodiment of the apparatus for implementing the method in accordance with the present invention. In this embodiment, the aspiration/bonding device (now designated by 50) comprises an aspiration bed 51 having a central chamber (riot shown) and a plurality of vents 511 communicated with the central chamber. The aspiration bed 51 further comprises plural outlets 52 that are communicated with the central chamber and respectively connected to plural inlets 531 of an outlet manifold 53. The outlet manifold 53 has an outlet that is communicated with an inlet (not labeled) of an aspiration means 54 such as a vacuum pump having an outlet 55. The air supply source or system 30 in the first embodiment is omitted. In addition, a cooling roller may be provided downstream the aspiration bed 51 to cool the web of cloth/coating 11 and 13 before reeling.

Figure 7:
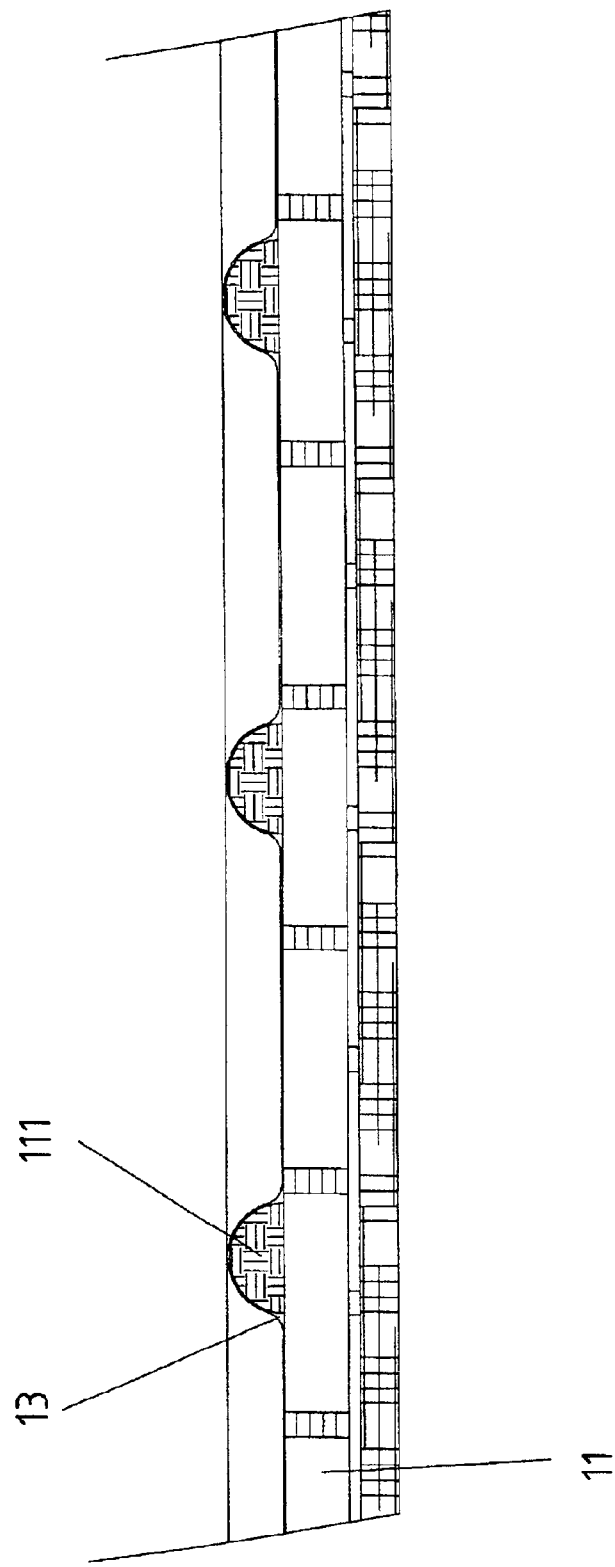
FIG. 7 is a schematic view of a web of cloth having a coating bonded thereon by the method in accordance with the present invention.

As illustrated in FIG. 7, after bonding of a coating 13 to a web of cloth 11 (e.g., a spandex mesh), the coating 13 is completely merged into the lattices 111 of the web of cloth 11 under the action of the strong aspiration.

Although the invention has been explained in relation to its preferred embodiment, it is to be understood that many other possible modifications and variations can be made without departing from the scope of the invention as hereinafter claimed.

What is claimed is:

1. A method for bonding a coating to a material web, comprising the steps of:
   (a) bonding the coating and the material web together by glue;
   (b) then heating the material web having the coating bonded thereto; and
   (c) then removing air between the coating and the material web to thereby provide thorough bonding between the coating and the material web, wherein the step of removing air comprises providing air removing means, wherein the air removing means comprises at least one aspiration cylinder through which the heated material web/coating passes, said at least one aspiration cylinder comprises a longitudinal chamber and a plurality of vents in an outer periphery thereof and communicated with the longitudinal chamber, the longitudinal chamber having an outlet, the air removing means further comprising an aspiration means having an inlet communicated with the outlet of the longitudinal chamber.

2. The method as claimed in claim 1, further comprising forcibly blowing air to the material web/coating in step (c) along a direction of air removal.

3. The method as claimed in claim 1, further comprising a step of cooling the material web/coating after step (c).

4. The method as claimed in claim 1, wherein the material web is a web of foam.

5. The method as claimed in claim 4, wherein the coating is transparent.

6. The method as claimed in claim 1, wherein the material web is a web of foam.

7. The method as claimed in claim 1, further comprising blowing air to the material web/coating passing through said at least one aspiration cylinder.

8. The method as claimed in claim 7, further comprising reeling the material web/coating that has passed through the air-removing means.

9. The method as claimed in claim 8, futher comprising providing a cooling roller between the reel and the air-removing means.

10. The method as claimed in claim 1, further comprising reeling the material web/coating that has passed through said at least one aspiration cylinder.

11. The method as claimed in claim 10, further comprising providing a cooling roller between the reel and the air-removing means.

12. The method as claimed in claim 1, wherein the air-removing means is a vacuum pump.

13. The method as claimed in claim 1, wherein the coating is transparent.

\* \* \* \* \*